United States Patent [19]
Abbott

[11] 3,834,169
[45] Sept. 10, 1974

[54] METHOD AND APPARATUS FOR LAYING LARGE DIAMETER PIPELINE SEGMENTS OFFSHORE

[75] Inventor: Phillip Andrew Abbott, Houston, Tex.

[73] Assignee: Brown & Root, Inc., Houston, Tex.

[22] Filed: July 11, 1973

[21] Appl. No.: 378,042

[52] U.S. Cl............... 61/72.3, 61/43, 29/157, 29/237, 269/48.1, 269/22
[51] Int. Cl......... F16l 1/00, B23p 19/04, B23q 3/14
[58] Field of Search ............. 61/72.1, 72.3; 29/237; 269/48.1; 285/18, 24

[56] References Cited
UNITED STATES PATENTS

| | | | |
|---|---|---|---|
| 1,874,081 | 8/1932 | Burrows | 61/72.3 |
| 3,233,315 | 2/1968 | Levake | 29/237 |
| 3,684,149 | 8/1972 | Ambler | 269/48.1 |
| 3,717,002 | 2/1973 | O'Brien et al. | 61/72.3 |

Primary Examiner—Jacob Shapiro
Attorney, Agent, or Firm—Burns, Doane, Swecker & Mathis

[57] ABSTRACT

A method and apparatus for laying a pipeline upon the bed of a body of water.

The apparatus includes a generally cylindrical male member operable to be positioned within the interior of one of a submerged pipeline segment and at least one pipeline segment to be laid. Operating in conjunction with the male member is a female member which is designed to be positioned within the interior of the other of the submerged pipeline segment and at least one pipeline segment to be laid. Expandable circumferential friction collars are mounted upon the male and female members to releasably secure the members within the interior of the pipeline segments. A flexible cable is securely connected to one of the male and female members operably connected within the pipeline segment to be laid and extends through the other of the male and female members operably positioned within the interior of the submerged pipeline segment for aligning the male and female members within the body of water. Following alignment, the flexible cable may serve to pull the male and female members into stabbing engagement and one end of the pipeline segment to be laid into abutting contact with the free end of the submerged pipeline segment.

The method includes the steps of positioning one member of a male and female member guide assembly within the free end of a submerged pipeline segment and positioning the other member of the male and female member guide assembly within at least one pipeline segment to be laid. The guide member positioned within at least one pipeline segment to be laid is fitted at one end with at least a first cable and at the other end with at least a second cable. The guide members and the at least one pipeline segment to be laid are lowered into body of water and the cables are tensioned to align the male and female member guide assembly within the body of water. Following alignment the male and female members of the guide assembly are interocnnected and stabbed into full engagement to position the pipeline segment to be laid in abutting contact with the free end of the submerged pipeline segment. The one member of the male and female member guide assembly which is connected to the free end of the submerged pipeline segment is then axially drawn to the free end of the thus laid at least one pipeline segment. The other member of the male and female member guide assembly is then disconnected and raised to the surface to be positioned within another at least one pipeline segment to be laid.

21 Claims, 9 Drawing Figures

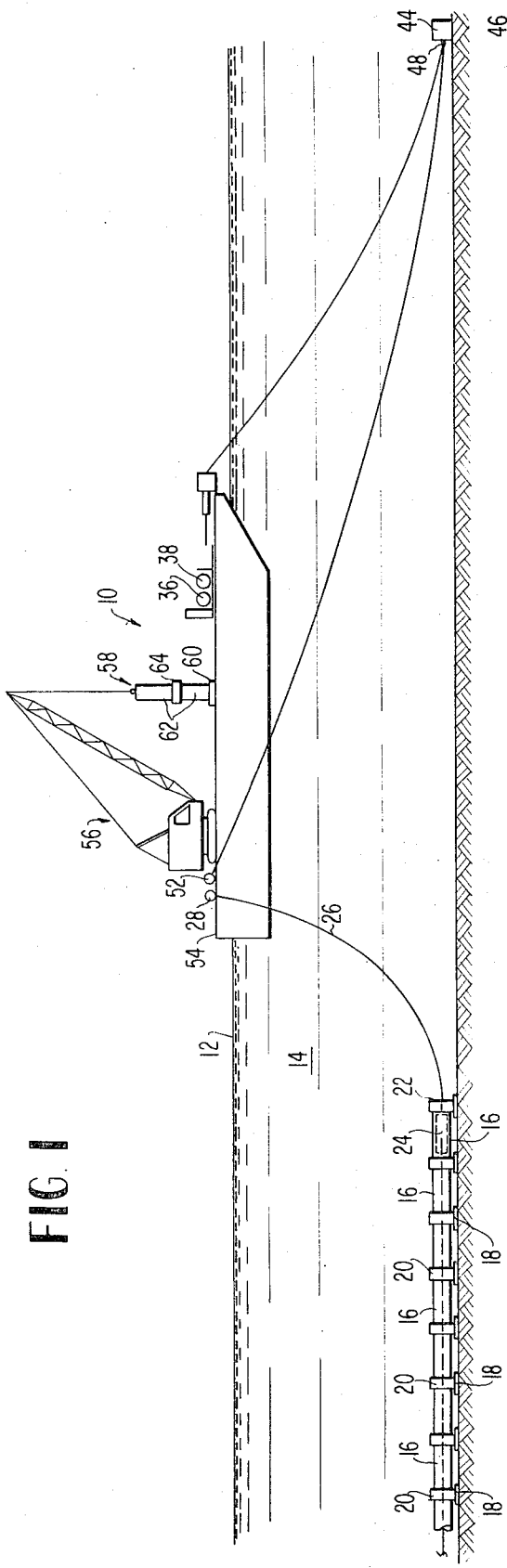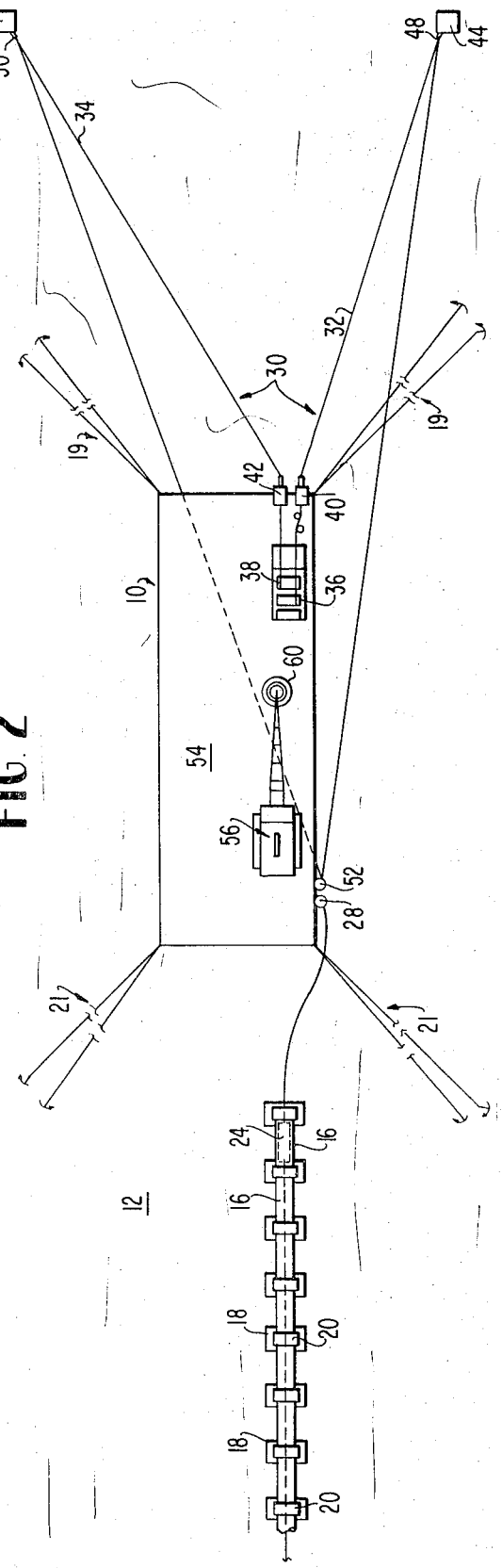

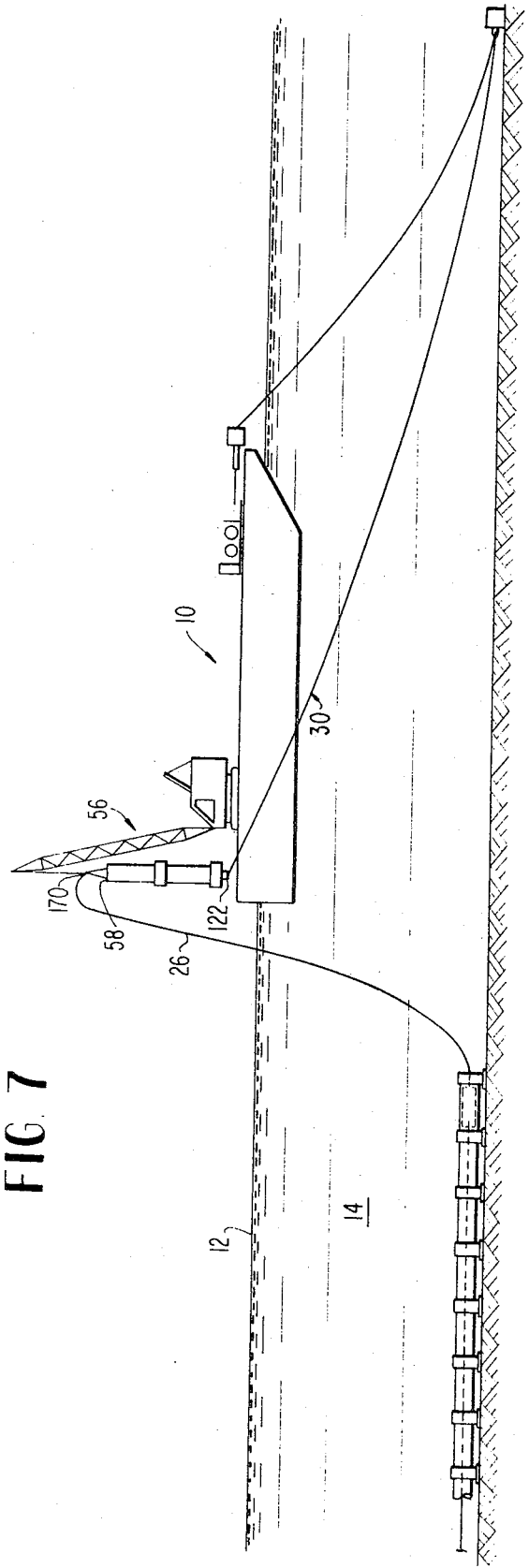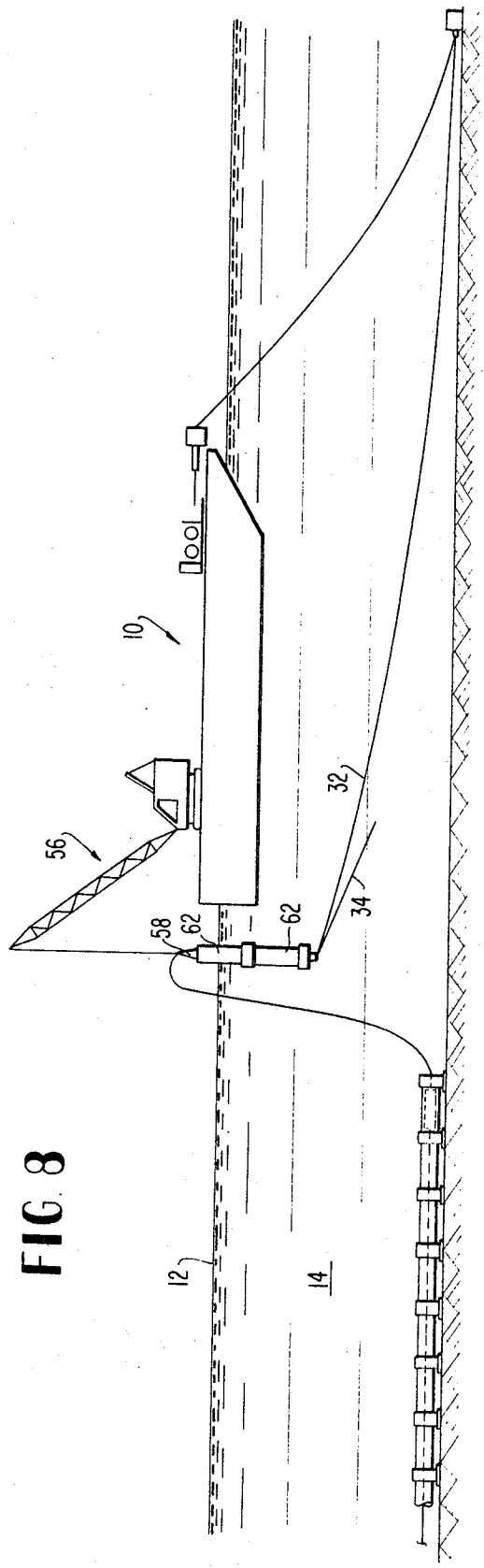

METHOD AND APPARATUS FOR LAYING LARGE DIAMETER PIPELINE SEGMENTS OFFSHORE

BACKGROUND OF THE INVENTION

The invention relates to a method and apparatus for laying a pipeline upon the bed of a body of water. More particularly the invention relates to a method and apparatus for laying large diameter pipeline segments upon the bed of a body of water, such as a lake or the seabed.

A past and present need exists to lay large diameter pipelines or "outfalls" from the shore of a body of water seaward, typically from 2 and 5 miles, upon the bed of the body of water. These submerged conduits find particular utility in conveying processed sewage to the sea in a sufficient volume of water wherein any contaminants contained therein may be rapidly diluted to a level consistent with judicious ecological management.

Moreover as plans for nuclear power stations are finalized an increasing need has arisen to lay very large diameter outfalls. In this connection, large diameter pipelines are needed to convey a high volume of sea water, which has been spent as a coolant in a nuclear power generating process, back to the sea at a depth and at a distance sufficient to minimize the possibility of raising the overall temperature of the sea water above an acceptable ecological level.

While a highly desirable method and apparatus for laying continuous, large diameter, pipelines which will be suitable to serve as outfalls are disclosed in a Lochridge et al. U.S. application Ser. No. 240,378, now U.S. Pat. No. 3,756,034, it is envisioned that a need will continue to exist for laying large diameter segmented pipelines.

In this connection, outfalls typically are formed utilizing a plurality of bell and spigot pipeline segments laid end to end and mounted to grade upon concrete-timber mats. The integrity of the pipeline at the bell/spigot joints is maintained by the provision of conventional clamping collars. The pipeline segments are normally formed from a concrete composition and vary from 30 to 100 or more inches in diameter and from 2 or 3 feet to 20 or more feet in length. Such pipeline segments are therefore understandably extremely difficult to manipulate and properly align during a laying operation.

In the past at least one technique for laying segmented subaqueous pipelines comprised suspending pipeline segments to be laid from a barge or a fixed platform supported above the surface of a body of water by very long extendible legs. While these devices have provided a degree of utility particularly with respect to raising and lowering the pipeline segments in a vertical mode difficulties have been occasioned during the final alignment and mating of the ends of the submerged conduit segments where horizontal control is necessary.

In this connection at least one further known device has been designed to facilitate axial alignment of conduit segments by the provision of a submergible pipelaying frame or gantry which may be submerged and disposed upon the water bed immediately in front of a previously laid pipeline segment. Various hydraulic assemblies are provided to laterally, axially and vertically adjust the pipeline segments into final abutment with a previously laid pipeline segment. While such gantry assemblies are believed to have provided in many respects an advance over previously known devices room for significant improvement remains.

In this connection it would be highly desirable to provide a method and apparatus for facilitating the alignment and position of a submergible large diameter pipeline segment into an abutting position with a previously laid pipeline segment to form a continuous pipeline composed of individual pipeline segments which will be highly economical and minimize the amount of potentially dangerous structure within the water exterior of the pipeline segments to be laid. Further it would be beneficial to provide automatic alignment and abutting capability independent of diver visual judgment.

OBJECTS AND SUMMARY OF THE INVENTION

Objects

It is therefore a general objection of the invention to provide a novel method and apparatus for laying subaqueous large diameter pipeline segments upon the bed of a body of water which will obviate or minimize problems of the type previously described.

It is a particular object of the invention to provide a novel method and apparatus for facilitating underwater alignment of large diameter pipeline segments to be laid.

It is a further object of the invention to provide a novel method and apparatus for facilitating the underwater handling of at least one large diameter pipeline segment to be laid.

It is yet a further object of the invention to provide a novel method and apparatus for facilitating the preparation on board a barge of submergible pipeline segments to be laid.

It is still a further object of the invention to provide a novel and simplified method and apparatus for handling of at least one large subaqueous pipeline segment with a minimun amount of structure exterior of the pipeline segment which may entangle submerged diver umbilical cords and may present a dangerous shiftable structure to work around in a submerged opaque environment.

It is another object of the invention to provide a novel method and apparatus which will facilitate positioning and final assembly of a sub-aqueous pipeline segment to be connected with a previously laid large diameter pipeline segment.

It is yet another object of the invention to provide a novel method and apparatus for automatically providing a final coaxial alignment of a large diameter pipeline segment to be laid and a previously laid pipeline segment which is not dependent upon diver visual control and judgment.

It is still another object of the invention to provide a novel method and apparatus for lowering a large diameter pipeline segment from a barge within a body of water and into abutting alignment with a previously laid segment which is highly structurally rugged and economical to construct initially and subsequently utilize and repair.

It is yet still another object of the invention to provide a novel method and apparatus for laying large diameter pipeline segments upon the bed of a body of water which is operable to function independent of a support barge deck crane during an alignment and coupling operation.

It is still yet another objection of the invention to provide a novel method and apparatus for laying large diameter pipeline segments upon the bed of a body of water which efficiently utilizes a support barge crane and thus enhances the laying rate of the sub-aqueous pipeline.

Brief Summary

A method and apparatus according to a preferred embodiment of the invention intended to accomplish at least some of the foregoing objects comprises a generally cylindrical male member operable to be positioned within the interior of one of a submerged pipeline segment and at least one pipeline segment to be laid. Operating in conjunction with the male member is a female member which is designed to be positioned within the interior of the other of the submerged pipeline segment and at least one pipeline segment to be laid. Expandable circumferential friction collars are mounted upon the male and female members to releasably secure the members within the interior of the pipeline segments. A flexible cable is securely connected to one of the male and female members operably positioned within the pipeline segment to be laid. The cable is further coaxially trained through the other of the male and female members operably positioned within the interior of the submerged pipeline segment for aligning the male and female members and thus the pipeline segments associated respectively therewith in a submerged posture within the body of water. Following alignment, the male and female members are preferably pulled by the cable into mating engagement to abut one end of the pipeline segment to be laid with the free end of the sumberged pipeline segment.

In order to facilitate underwater handling and control of the pipeline segment to be laid, the one of the male and female member positioned within the interior of the segment to be laid is provided with a plurality of circumferential ballast chambers to that the pipeline segment upon being submerged may be ballasted to a slight positive buoyancy. In this condition, the flexible cable is operable to controllably pull the pipeline segment to be laid into alignment and final abutting engagement with the previously laid pipeline segment.

Operationally the invention includes the steps of positioning one member of a male and female member guide assembly within the free end of a submerged pipeline segment and positioning the other member of the male and female member guide assembly within a pipeline segment to be laid. The guide member positioned within the pipeline segment to be laid is fitted at one end with a first cable and at the other end with at least a second cable. Preferably ballast within the other of the male and female member carrying the pipeline segment to be laid is trimmed so as to render the at least one pipeline segment to be laid slightly positively buoyant. The cables are then tensioned to align the male and female member guide assembly within the body of water. Following alignment the male and female members of the guide assembly are interconnected and stabbed into full engagement to position the pipeline segment to be laid in abutting alignment with the free end of the previously laid submerged pipeline segment. The one member of the male and female member guide assembly which is connected to the free end of the previously laid submerged pipeline segment is then axially drawn to the free end of the thus laid at least one submergible pipeline segment. The other member of the male and female member guide assembly is then disconnected from the one member and raised to the surface to be positioned within another at least one pipeline segment to be laid.

THE DRAWINGS

Other objects and advantages of the present invention will become apparent from the following detailed description taken in conjunction with the accompanying drawings wherein:

FIG. 1 is a side elevational schematic view of the overall arrangement comprising the subject invention including a floating barge, a previously laid plurality of large diameter pipeline segments positioned upon the bed of a body of water, and at least one submergible pipeline segment on board the barge being fitted to be laid;

FIG. 2 is an operational plan view of the overall arrangement forming the subject invention as depicted in FIG. 1;

FIG. 7 is a side elevational view disclosing a male alignment member positioned within two joined large diameter pipeline segments and being connected at one end to a first cable and at the other end to at least a second cable and being suspended above a body of water by a deck crane;

Figure 9:
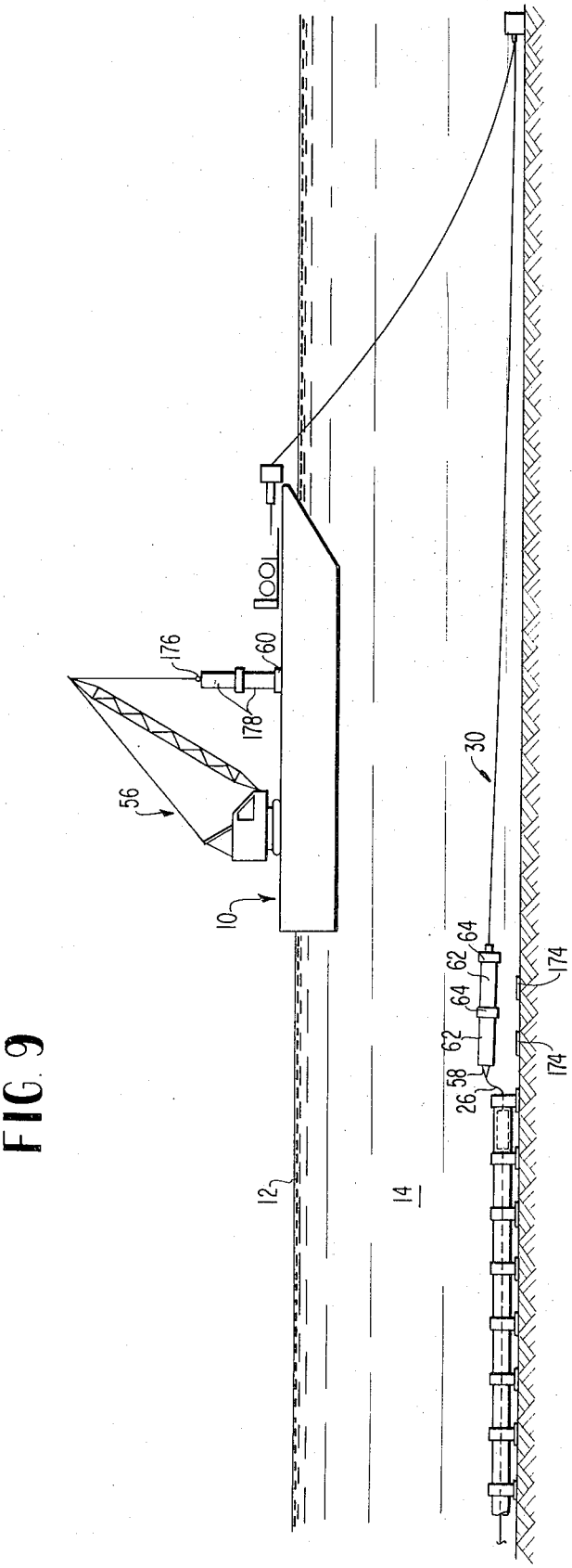

FIG. 8 is a side elevational sequential view disclosing the further operational steps of taking up the first and second cables connected to the male alignment member and lowering the male alignment member including the two large diameter pipeline segments connected thereto into the body of water; and FIG. 9 discloses a side elevational sequential view of the male alignment member in a slightly neutrally buoyant condition positioned within the body of water in a floating posture adjacent to the free end of the previously laid pipeline segment and tensioning the first and second cables connected to the male alignment member to first draw the male member into axial alignment with a female member positioned within the free end of the previously laid pipeline segment and subsequently into full stabbing engagement therewith while the deck crane is making up at least one further pipeline segment to be laid.

DETAILED DESCRIPTION

Overall Description of Structure and Operating Environment.

Referring now to the drawings, and particularly to FIGS. 1 and 2 thereof, there will be seen the general operating environment of the subject invention.

More specifically a barge 10 is disclosed floating generally upon the surface 12 of a body of water 14. The barge is depicted as being positioned in advance of a previously laid plurality of submerged large diameter segmented conduits 16 positioned upon concrete-timber pads 18 which serve to maintain a desired grade for the pipeline. The individual submerged pipeline segments 16 are maintained in engagement by the provision of clamping collars 20 positioned at each junction of the pipeline segments.

The concrete-timber mats 18 and pipeline clamping collars 20 are of a conventional design, previously well known in the art, and therefore a detailed discussion of these elements and manner of application is not included herein. Moreover, the barge 10 is of a conventional design utilizing fore take up and aft payout winch and cable assemblies 19 and 21 respectively to provide ambulatory navigation of the barge along a desired pipelaying route in a manner well known to those of ordinary skill in the art.

Positioned within and at a free end 22 of the previously laid pipeline segment 16 is a female internal guide and alignment member 24.

A first flexible wire cable 26 extends from a hitch 28 attached to the barge 10 into the body of water 14 and is coaxially threaded through the female member 24 and coaxially through the previously laid pipeline 16, back to a winch (not shown) at a shore location. Alternatively, the cable 26 may extend back through the previously laid pipeline segments 16 to a manhole (not shown) and up to a winch on board a barge (also not shown).

As best illustrated in FIG. 2 a second cable assembly 30 comprising a first flexible wire cable 32 and a second flexible wire cable 34 extends from a pair of deck winches 36 and 38, respectively, through guides 40 and 42 down to anchors 44 and 46 and snatch blocks 48 and 50. The wire ropes 32 and 34 are trained around the snatch blocks 48 and 50 respectively and then back to a hitch 52 attached to the deck 54 of the barge 10 in an accessible location adjacent to hitch 28.

The deck 54 of the barge 10 is provided with the usual complement of operational equipment (not shown) including a pedestal or movable crane 56. The crane 56 is operable to position a male guide member 58 in an upright posture upon a make-up base 60 positioned upon the deck 54 of the barge. Once the male member is vertically positioned, one or more large diameter pipeline segments 62 are coaxially lowered over the male member. The pipeline segments 62 are of the previously discussed large diameter bell and spigot type which, for example, may have a diameter of approximately 90 to 100 inches and an axial length of approximately 18 feet.

An annular collar 64 is fitted around the joint and the pipeline segments 62 tested for seal integrity. The pipeline segments 62 to be laid are then ready to be lowered into the body of water 14 in a manner which will be discussed in detail hereinafter.

Structural Details of Male and Female Guide Assembly.

Referring now specifically to FIGS. 3–6, there will be seen structural details of a male and female guide assembly comprising a preferred embodiment of the invention.

As previously discussed, a male section 58 of the guide assembly is shown positioned within at least two large diameter pipeline segments 62.

The male guide and alignment assembly 58 is fashioned with a cylindrical outer shell 70 and a coaxially positioned cylindrical inner shell 72. A first end cap 74 extends over and seals one end of the inner and outer sheels. A second end cap 76 extends between the outer shell 70 and the inner shell 72 to provide seal integrity at the other end of the male member.

A plurality of axially spaced circumferential bulkhead discs 78 extend between the outer surface of the inner shell 72 and the inner surface of the outer shell 70 to form a plurality of circumferential ballast compartments 80. Each compartment is provided with a ballast and deballast system which is schematically represented by line 82 having tees 84 which tap into each compartment 86. In this connection, while one line 82 is disclosed, it will be appreciated that a plurality of lines may actually be utilized which will provide a ballast and deballast connection to each of the individual chambers 80, as desired.

In order to retain the pipeline segments to be laid 62 upon the male guide member 58, at least one hydraulic gripping collar 86 is provided between the exterior cylindrical shell 70 and the interior surface of each conduit segment 62.

Figure 6:
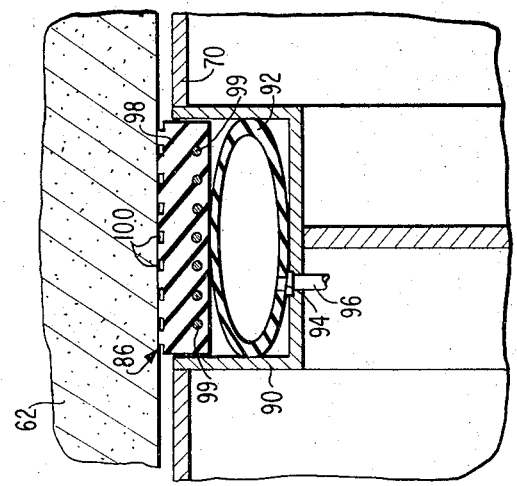
FIG. 6 is a detailed partial cross-sectional view of a gripper assembly as utilized in connection with the male and female members depicted in FIG. 3.
Figure 5:
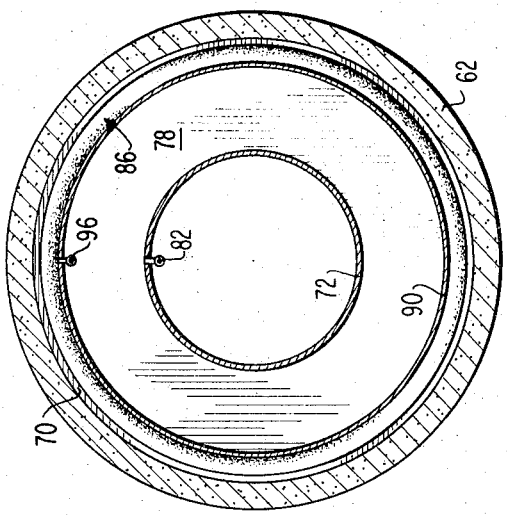
FIG. 5 is a cross-sectional view taken along section line 5—5 in FIG. 3.
Figure 4:
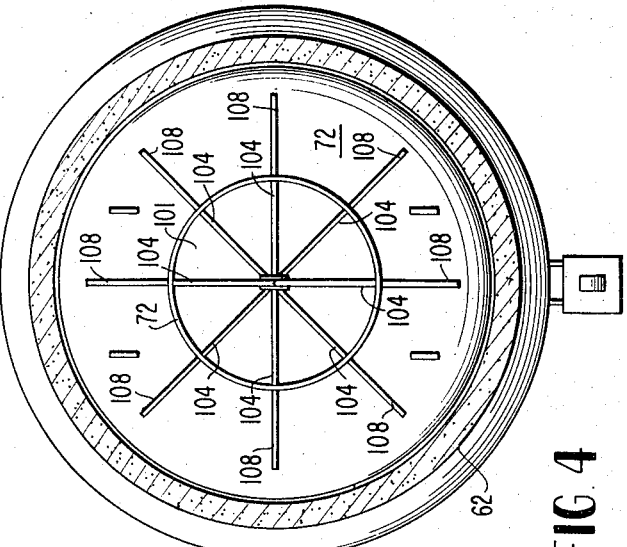
FIG. 4 is a cross-sectional view taken along section line 4—4 in FIG. 3.

A detailed sectional illustration of a gripping collar 86 is provided in FIG. 6. In this connection, a circumferential recessed channel 90 is fashioned into the outer cylindrical shell 70. Positioned within the channel is a first expandable inner tube 92 which is fitted with fluid tap 94, which in turn is connected to a hydraulic line 96. Circumferentially mounted about the inner tube 92 is a circumferential expandable friction ring 98. The friction ring 98 may be fashioned with an outer channeled or scored wall surface 100 and may be composed of a conventional high friction composition so as to provide a high friction coefficient during engagement with the interior surface of the conduit segment 62. The friction ring 98 may be radially inwardly biased by a plurality of reinforcing and biasing loops 99.

The cylindrical inner shell 72 projects at one end thereof axially beyond the extend of the cylindrical outer shell and end wall 76 and is covered by an end wall 101. A conical member 102 is connected to end wall 101 and is composed of a plurality of radially projecting triangular plates 104 which are actually joined and terminate in an apex 106.

A further plurality of triangular radially projecting plates 108 extend between the outer surface of the inner cylindrical shell 72 and the end cap 76. This second set of radially projecting plates 108 serves as a final abutment and alignment guide to be discussed in detail hereinafter.

A second compatibly dimensioned member of the male and female member guide assembly is the previously mentioned female member 24.

The female member 24 includes a cylindrical outer shell 110 and a coaxially disposed cylindrical inner shell 112. The inner shell 112 is maintained concentric with respect to the outer shell by a plurality of axially spaced radially extending circumferential disc plates 114.

A diaphragm 116 is positioned across one end of the female member 24 and is provided with a central aperture 118. The other end of the female member is provided with a sloping interiorly directed conical guide surface 120 which extends between the outer shell 110 and the inner shell 112. The conical guide surface 120 initially coacts with radially projecting plates 104 and secondarily with radially projecting plates 108 in a guide and alignment function to be discussed in detail hereinafter.

In order to securely attach the female guide member 24 within the free end of a previously laid pipeline segment, a plurality of circumferentially extending axially spaced gripping assemblies 130 are fashioned within the outer shell of the female member. The details of gripping assemblies 130 are identical with the previously discussed gripping assemblies 86. The foregoing discussion with respect to assembly 86 is therefore hereby repeated by reference with respect to the assemblies 130.

A hydraulic line 132 is connected to each of the gripping assemblies 130 and extends through the previously laid conduit back to a shore location or back to a manhole and a surface floating control barge (not shown).

The previously discussed first flexible wire cable 26 may be operably connected to an eye 134 extending through the apex 106 of the cone assembly 102. The cable 26 is then extended coaxially through the female member 24 and the aperture 118 back to a winch as previously discussed. Thus the male member 58 of the guide assembly may be pulled into alignment and stabbing contact with the female member 24 by tensioning cable 26 from a shore location or a control barge (not shown). Alternatively, final stabbing of the male member with respect to the female member may be provided by one or more hydraulic piston and cylinder assemblies 140.

In this latter connection each of the piston and cylinder assemblies 140 may be connected to the male member 58 by a circumferential mounting collar 144. The hydraulic cylinders may be further secured by a second mounting collar 146, extending about one of the pipeline segments 62 to be laid. The translating arms 148 of the hydraulic cylinder assemblies 140 may be operably connected through wire cable 150 to a collar 152 circumferentially mounted about the exterior surface of the free end of a previously laid conduit 16. Therefore, actuation of the hydraulic cylinder assemblies 140 by selectively supplying fluid through lines 142 or 144 may serve to draw the male member and the conduit segment 62 carried thereby into final abutting engagement with the free end of the previously laid pipelines.

Once the pipeline segments 62 to be laid are placed in abutment with the free end of a previously laid pipeline segment 16 and a connecting collar 20 is fitted thereto, it is desirable to withdraw the male member 58 from the interior of the thus laid pipeline segments 62 and to further draw the female member 24 to the free end thereof.

The drawing operation is facilitated by the provision of a plurality of short connecting cables 160 extending between pad eyes 162 mounted upon the end cap 76 of the male member and pad eyes 164 mounted upon the conical guide surface of the female member 24.

Alternatively to providing the flexible connecting cables 160, the exterior surface of the interior shell 72 of the male members may be provided with radially projected hydraulically or spring actuated latches (not shown) which are operable to be received within compatibly dimensioned inwardly projecting wells (also not shown) fashioned within the interior surface of the inner cylindrical shell 112 of the female member 24.

Mode of Operation.

As specifically depicted in FIGS. 1 and 2 and as previously discussed, an advantageous method of laying large diameter segmented pipelines upon the bed of a body of water utilizing the aforedescribed apparatus initially involves positioning the female member within the free end of a previously laid submerged pipeline segment 16. A flexible wire cable 26 is coaxially trained through the female member and extends through the previously laid submerged conduit to a shore location or a manhole where it may project upwardly to a control barge and take-up winch (not shown). The other end of the flexible wire cable 26 is connected to a hitch 28 on board the pipe laying barge 10.

At least a second cable is also provided, which in a preferred embodiment, comprises a plurality of cables 32 and 34 which extend around snatch blocks 48 and 50, as previously discussed, and terminate at one end at a deck hitch 52 and at the other end on take-up and pay-out deck winches 36 and 38.

The male member 58 is lifted by crane 56 and righted upon an assembly frame 60. At least a pair 62 of large diameter pipeline segments to be laid are axially positioned about the male member. A collar 64 is securely fastened to the joint between the pipeline segments 62. The joint is then tested for seal integrity in a manner well known in the art. The male member gripping assemblies 86 are actuated to firmly grip the interior surface of the pipeline segments.

Turning now to FIGS. 7 and 8, the next step comprises utilizing the deck crane 56 to lift the male guide member 58. In this connection the first flexible wire cable 26 is connected to the first end 170 of the guide 58 and the at least second wire cable system 30, which includes cables 32 and 34, is connected to a second end 172 of the guide 58. The next step comprises lowering the male guide member 58 and the conduit segments 62 to be laid into the body of water 14.

Once the male guide 58 is immersed within the body of water, the circumferential ballast chambers 80 are trimmed to provide a slightly positive buoyancy to the male guide member and conduit segments to be laid. Since the male member is provided with a plurality of axially spaced buoyancy chambers 80 along the length thereof the assembly will be suspended in the body of water in a horizontal posture.

Although ballasting to slight positive buoyancy is preferred, alternatively the male guide 58 may be ballasted to slight negative buoyancy in which case the deck crane 56 would be utilized to support the guide member and conduit segments to be laid during alignment.

Referring now to FIG. 9, the first wire cable 26 connected to a first end of the male member 58 is tensioned while the at least second cable assembly 30, comprising cables 32 and 34, connected to the second end of the male member 58 is controllably tensioned. By the provision of the foregoing tensioning step the conduit segments 62 to be laid are brought into general axial alignment with the previously laid submerged conduit.

In thoses instances where maximum alignment control is desired, cables (not shown) which may be taken up and payed out, may also be attached to opposing sides of the male guide 58 at the mating end thereof and laterally extend with respect thereto to facilitate lateral control during the aligning process.

While the cables are being tensioned and the pipeline segments to be laid are being pulled into the body of water, divers may then position and jet into appropriate elevation concrete-timber mats 174 to engage with coupling collars 64.

Referring now to FIG. 9, the first wire cable 26 connected to a first end of the male member 58 is tensioned while the at least a second cable assembly 30, comprising cables 32 and 34, connected to the second end of the male member 58 is controllably tensioned. By the provison of the foregoing tensioning step the conduit segments 62 to be laid are brought into general axial alignment with the previously laid submerged conduit.

While the cables are being tensioned and the pipeline segments to be laid are being pulled into the body of water, divers may then position and jet into appropriate elevation concrete-timber mats 174 to engage with coupling collars 64.

Moreover, while the male guide assembly 58 is being brought into alignment by the first and second flexible cables, the deck crane 56 is swung about to position a second male guide member 176 in an upright posture on the deck mounted guide frame 60 so that a second set of conduit segments to be laid 178 may be coupled and tested while the conduit segments 62 are being laid.

Figure 3:
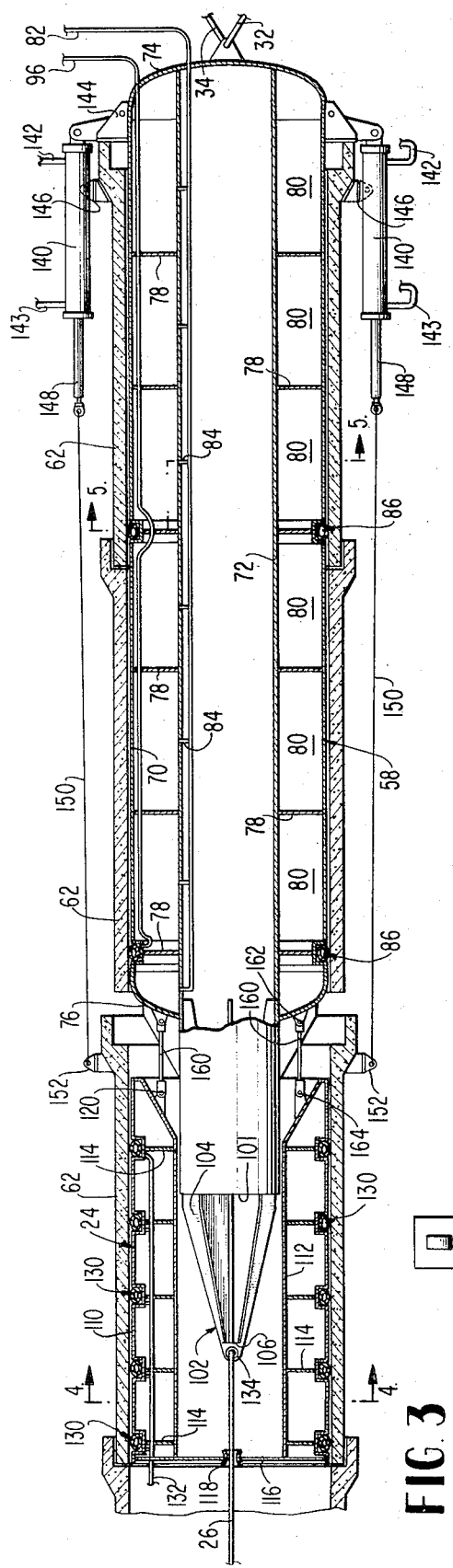
FIG. 3 is a detailed cross-sectional view of a male and female member guide assembly in a final aligned position just prior to final stabbing engagement and abutting at least one pipeline segment to be laid into communication with a previously laid pipeline segment.

Returning now to conduit segments 62 and also FIG. 3, it will be seen that the conical member 102 of the male guide member 58 is first drawn by cable 26 coaxially into engagement with the female guide member 24 with guiding alignment provided by contact of cone 102 with the conical guide surface 120.

Once the male guide member is in the posture with respect to the female guide member as depicted in FIG. 3, flexible connecting cables 160 may be manually connected and the cable 26 is further tensioned to pull the male member 58 fully into abutting relationship with respect to the female guide assembly 24.

Axial movement of the male member with respect to the female member is limited by the radially projecting triangular guide members 108 contacting the conical guide surface 120. This contact will further serve to coaxially align the male and female members of the guide assembly and assure proper positioning of the spigot end of the conduit segment 62 to be laid with the bell end of the previously laid conduit segment 16.

Once the conduit segments are fully positioned in abutting engagement a coupling collar 20 may be connected thereto to securely and permanently fasten the conduit segment into a unitary pipeline.

As previously discussed, alternative to utilizing the tying cables 106 the exterior surface of the interior cylindrical member 72 may be provided with latches to mechanically engage with recesses formed in an interior surface of the inner cylindrical member 112 of the female guide member 24.

Also alternative to further tensioning wire cable 26 to provide the final stabbing engagement of the male member with the female member, the flexible cables 150 may be connected between the pulling collar 152 and the ends of rods 148 of the optional hydraulic cylinder assemblies 140. Actuation of there hydraulic cylinder assemblies may be then utilized to provide the final stabbing engagement of the male and female members.

Once the pipeline segments 62 to be laid are connected to the previously laid pipeline and the collar 20 attached, the hydraulic gripping assemblies 86 and 130 of the male and female members are relaesed and the second cable assembly 30 is tensioned while the first cable 26 is payed out to axially translate the connected male and female guide assemblies axially through the previously laid pipeline segments 62 until the female member is brought to the free end of the previously laid pipeline segment 62. In this posture, the connecting cables 160 are disconnected or the alternative mechanical latch assemblies are disengaged and the gripping assemblies 130 are reactuated.

The wire cable 26 is then further payed out and the circumferential ballast chambers 80 are blown to raise the male guide member 58 to the surface for subsequent reuse.

The first cable 26 and second cable assembly 30 are then connected to the first and second ends of the previously assembled male guide member 176 and its large diameter pipeline segments 178, and the procedure is repeated.

While the foregoing invention has been illustrated and described in a preferred form with the female guide member 24 positioned within the free end of the submerged pipeline segment to be laid it will be appreciated that the positioning of the male and female members within the pipeline segments may be reversed with the male member 58 operably positioned within the free end of the submerged pipeline segment and the female member within the at least one pipeline segment to be laid.

SUMMARY OF THE MAJOR ADVANTAGES OF THE INVENTION

It will be appreciated from the foregoing that the subject invention provides a novel method and apparatus which is economical and minimizes the structural materials necessary to form coupling assemblies and further minimizes the amount of structural members exterior of the conduits to be laid, which may be potentially dangerous to divers working in the immediate vicinity.

Another significant aspect of the invention is the provision of a novel method and apparatus which will facilitate axial alignment of extremely large diameter pipeline segments to be laid wherein the alignment is automatically provided by taking up and paying out cables rather than directing alignment by visual judgment of divers.

Further, underwater handling of the large diameter conduit assembly is greatly facilitated by the provision of a buoyancy control system interior of the large diameter pipeline segments to be laid.

Yet additional significant advantages are provided by the provision of a mating male and female guide assembly of the type which is suitable to facilitate final alignment and guiding of extremely large diameter pipeline segments automatically into an aligned abutting posture upon the bed of a body of water.

Yet another significant independent aspect of the invention is the provision of a highly economical system which may be readily fabricated and repaired, and which will provide a relatively rapid and inexpensive laying technique for large diameter pipelines.

Still further, the subject method and apparatus provides a novel system for laying large diameter pipeline segments wherein a support barge deck crane is efficiently utilized. Moreover, potentially dangerous current or wave induced pendulum movement of a crane supported pipeline within the body of water is eliminated While the invention has been described with reference to preferred embodiments it will be appreciated by those skilled in the art that additions, deletions, modifications and substitutions or other changes not specifically described may be made which will fall within the purview of the appended claims.

What is claimed is:

1. A guide assembly for facilitating the alignment and mating of a submerged pipeline segment and at least one submergible pipeline segment to be laid comprising:
   a generally cylindrical male member operable to be positioned within the interior of one of a submerged pipeline segment and at least one submergible pipeline segment to be laid;
   means mounted upon the exterior surface of said generally cylindrical male member for releasably securing said generally cylindrical male member within the interior of the one of the submerged pipeline segment and at least one submergible pipeline segment to be laid;
   a generally cylindrical female member operable to be positioned within the interior of the other of the submerged pipeline segment and at least one submergible pipeline segment to be laid;
   means mounted upon the exterior surface of said generally cylindrical female member for releasably securing said generally cylindrical female member within the interior of the other of a submerged pipeline segment and at least one submergible pipeline segment to be laid;
   means connected to one of said male and female members for aligning said one member and said at least one submergible pipeline segment to be laid, upon
   submerging said at least one submergible pipeline segment, with the other of said male and female members and said submerged pipeline segment; and
   means connected to one of said male and female members for stabbing said one member into engagement with said other member of said female and male members and abutting said at least one submergible pipeline segment to be laid with said submerged pipeline segment.

2. A guide assembly for facilitating the alignment and mating of a submerged pipeline segment and at least one submergible pipeline segment to be laid as defined in claim 1 wherein said male member comprises:
   a cylindrical outer shell;
   a cylindrical inner shell coaxially mounted within said outer shell and having one end thereof axially extending beyond said outer shell;
   said axially extending end of said inner shell having a cone member coaxially affixed thereto for facilitating alignment of said male and female members.

3. A guide assembly for facilitating the alignment and mating of a submerged pipeline segment and at least one submergible pipeline segment to be laid as defined in claim 2 wherein said means for releasably securing said male member to the interior of the one of the submerged pipeline segment and the at least one submergible pipeline segment to be laid comprises:
   at least one hydraulically extendible friction collar circumferentially mounted upon said male member.

4. A guide assembly for facilitating the alignment and mating of a submerged pipeline segment and at least one submergible pipeline segment to be laid as defined in claim 1 wherein said female member comprises:
   a cylindrical outer shell,
   a cylindrical inner shell coaxially mounted within said outer shell, and
   a conical guide surface at one end of said female member extending from said outer shell slopingly inwardly to said inner shell.

5. A guide assembly for facilitating the alignment and mating of a submerged pipeline segment and at least one submergible pipeline segment to be laid as defined in claim 4 wherein said means for releasably securing said female member to the interior of the other of the submerged pipeline segment and at least one submergible pipeline segment to be laid comprises:
   a plurality of axially spaced hydraulically extendible friction collars circumferentially mounted upon said female member.

6. A guide assembly for facilitating the alignment and mating of a submerged pipeline segment and at least one submergible pipeline segment to be laid as defined in claim 1 and further comprising:
   a plurality of circumferential ballast chambers formed within said one of said male and female member positionable within the interior of said at least on submergible pipeline segment to be laid.

7. A guide assembly for facilitating the alignment and mating of a submerged pipeline segment and at least one submergible pipeline segment to be laid as defined in claim 1 wherein said means for aligning comprises:

a flexible cable connected to one end of said one of said male and female members positioned within the interior of the at least one submergible pipeline segment to be laid and extending coaxially through the other of said male and female members positioned within the interior of the submerged pipeline segment.

8. A guide assembly for facilitating the alignment and mating of a submerged pipeline segment and at least one submergible pipeline segment to be laid as defined in claim 7 wherein said means for aligning further comprises:
   at least a second flexible cable connected to the other end of said one of said male and female members positioned within the interior of the at least one submergible pipeline segment to be laid.

9. A guide assembly for facilitating the alignment and mating of a submerged pipeline segment and at least one submergible pipeline segment to be laid as defined in claim 1 wherein said means for stabbing comprises:

a flexible cable connected to one end of said one of said male and female members positioned within the interior of the at least one submergible pipeline segment to be laid and extending coaxially through the other of said male and female members positioned within the interior of the submerged pipeline segment.

10. A guide assembly for facilitating the alignment and mating of a submerged pipeline segment and at least one submergible pipeline segment to be laid as defined in claim 1 wherein said means for stabbing comprises:
at least one hydraulic piston and cylinder assembly operably connected between the submerged pipeline segment and the at least one submergible pipeline segment to be laid for drawing the at least one submergible pipeline segment to be laid into abutment with the free end of the submerged pipeline segment.

11. A guide assembly for facilitating the alignment and mating of a submerged pipeline segment and at least two submergible pipeline segments to be laid comprising:
a female member operably positionable within the free end of the submerged pipeline segment and including
a cylindrical outer shell,
a cylindrical inner shell coaxially mounted within said outer shell, and
a conical guide surface positioned at one end of said female member adjacent the free end of the submerged pipeline segment and extending from said outer shell slopingly inwardly to said inner shell and
a plurality of axially spaced hydraulically extendible friction collars circumferentially mounted upon said female member for releasably securing said female member within the free end of the submerged pipeline segment;
a male member operably positionable within the interior of at least two submergible pipeline segments to be laid and including
a cylindrical outer shell,
a cylindrical inner shell coaxially mounted within said outer shell and having one end thereof axially extending beyond said outer shell,
said axially extending end of said inner shell having a cone member coaxially affixed thereto for facilitating alignment of said male and female members, and
at least two hydraulically extendible friction collars circumferentially mounted upon said male member, said at least two collars being spaced axially whereby at least one of said collars engages one of the at least two submergible pipeline segments to be laid;
a first flexible cable means connected at one end to the apex of said cone member positioned at one end of said male member and coaxially extending through said cylindrical inner shell of said female member; and
at least a second flexible cable means connected at the other end of said male member,
said first and at least a second flexible cable means, upon applying axial tension thereto, operably serving to align said male member carrying the at least two pipeline segments to be laid with said female member positioned within the free end of the submerged pipeline segment, and said first flexible cable means, upon applying further axial tension thereto, operably serving to draw said conical member of said male member into alignment and guiding engagement with said conical guiding surface of said female member and further serving to engage one end of said at least two submergible pipeline segments carried by said male member into abutting contact with the free end of said submerged pipeline segment.

12. A guide assembly for facilitating the alignment and mating of a submerged pipeline segment and at least a pair of submergible pipeline segments to be laid as defined in claim 11 and further comprising:
a plurality of circumferential ballas chambers formed between said inner and outer cylindrical shells of said male member for controlling the buoyancy of the male member and the at least two submergible pipeline segments carried thereby for facilitating the alignment and connection of the at least two submergible pipeline segments with the free end of the submerged pipeline segment.

13. A method for laying a pipeline upon the bed of a body of water composed of pipeline segents joined end to end comprising the steps of:
positioning one member of a male and female member guide assembly within the free end of a submerged pipeline segment with the mating end thereof outwardly directed at the free end of the submerged pipeline segment;
positioning the other member of the male and female member guide assembly within the interior of at least one submergible pipeline segment to be laid, connecting the mating end of the other member of the male and female member guide assembly to a first cable extending coaxially through the one member of the male and femael member guide assembly positioned within the free end of the submerged pipeline; connecting the other end of the other member of the male and female member guide assembly to at least a second cable;
lowering the other member of the male and female member guide assembly and the at least one submergible pipeline segment into the body of water;

taking up the first cable to draw the other member of the male and female member guide assembly into alignment with the one member of the male and female guide assembly;
connecting the other member of the male and female guide assembly to the one member of the male and female guide assembly;
stabbing into full engagement the male and female members of the alignment assembly and thereby
positioning the at least one submergible pipeline segment into abutting alignment with the free end of the submerged pipeline segment,
drawing the one member of the male and female member guide assembly from within the free end of the submerged pipeline segment axially through the at least one submergible pipeline segment to a position at the free end of the at least one submergible pipeline segment;
disconnecting the other member of the male and female member guide assembly from the one member of the male and female member guide assembly;

raising the other member of the male and female member guide assembly at least to the surface of the body of water and repeating the foregoing steps beginning at the step of positioning the other member of the male and female member guide assembly within at least one submergible pipeline segment to be laid.

14. A method for laying a pipeline upon the bed of a body of water composed of pipeline segments joined end to end as defined in claim 13 and further comprising the step of:

subsequent to said step of connecting the other end of the other member to at least a second cable, ballasting the other member of the male and female guide assembly to render the other member and the at least one submergible pipeline segment slightly positively buoyant.

15. A method for laying a pipeline upon the bed of a body of water composed of pipeline segments joined end to end as defined in claim 14, wherein said step of lowering the other member into the body of water is achieved by a deck crane mounted upon a barge and following said step of ballasting the step of:

releasing the connection of the deck crane from the other member of the male and female member guide assembly.

16. A method for laying a pipeline upon the bed of a body of water composed of pipeline segments joined end to end as defined in claim 14 wherein said step of stabbing comprises the step of:

tensioning the first cable to draw the other member of the male and female member guide assembly into engagement with the one member of the male and female member guide assembly.

17. A method for laying a pipeline upon the bed of a body of water composed of pipeline segments joined end to end as defined in claim 14 wherein said step of stabbing comprises the step of:

actuating hydraulic piston and cylinder assemblies operably extending between the free end of the submerged pipeline segment and the at least one pipeline segment.

18. A method for laying a pipeline upon the bed of a body of water composed of pipeline segments joined end to end as defined in claim 13 and further comprising the step of:

simultaneously with said step of taking up the first cable the step of paying out the at least a second cable to facilitate axial alignment of the at least one submergible pipeline segment with the submerged pipeline segment.

19. A method for laying a pipeline upon the bed of a body of water composed of pipeline segments joined end to end as defined in claim 18 and further comprising the steps of:

guiding the at least a second cable from at least one winch mounted on board a barge around a snatch block mounted on an anchor positioned ahead of the position of the barge generally along the intended route of the pipeline to be laid; and controlling payout of the at least a second cable from the at least one winch mounted upon the deck of the barge.

20. A method for laying a pipeline upon the bed of a body of water composed of pipeline segments joined end to end as defined in claim 13 and further comprising the steps of:

following said step of positioning the other member of the male and female member guide assembly within the interior of at least one submergible pipeline segment to be laid; the step of actuating concentric hydraulic gripping means carried by the other member to radially project therefrom and releasably securely engage the interior of the at least one submergible pipeline segment to be laid; and prior to said step of drawing the one member of the male and female member guide assembly from within the free end of the submerged pipeline segment, the step of deactuating the concentric hydraulic gripping means carried by the other member to radially withdraw the gripping means from engagement with the interior of the at least one submergible pipeline segment after it has been laid.

21. A method for laying a pipeline upon the bed of a body of water composed of pipeline segments joined end to end as defined in claim 20 and further comprising the steps of:

prior to withdrawing the one member of the male and female member guide assembly from within the free end of the submerged pipeline segment, the step of deactuating a plurality of gripping means encircling the one member to radially withdraw the gripping means from engagement with the interior of the submerged pipeline segment; and following said step of drawing the one member to a position at the free end of the at least one submergible pipeline segment, the step of actuating the plurality of gripping means encircling the one member into secure contact with the interior of the at least one submergible pipeline segment.

* * * * *